(12) United States Patent
Sebastian et al.

(10) Patent No.: US 11,513,229 B2
(45) Date of Patent: Nov. 29, 2022

(54) MULTI-BEAM PROCESSING OF LIDAR VIBRATION SIGNALS

(71) Applicant: DSCG SOLUTIONS, INC., Chantilly, VA (US)

(72) Inventors: Richard Sebastian, Frederick, MD (US); William Charles Symons, Spotsylvania, VA (US)

(73) Assignee: DSCG Solutions, Inc., Chantilly, VA (US)

( * ) Notice: Subject to any disclaimer, the term of this patent is extended or adjusted under 35 U.S.C. 154(b) by 340 days.

(21) Appl. No.: 16/814,673

(22) Filed: Mar. 10, 2020

(65) Prior Publication Data

US 2020/0292303 A1    Sep. 17, 2020

Related U.S. Application Data

(60) Provisional application No. 62/819,332, filed on Mar. 15, 2019.

(51) Int. Cl.
| | |
|---|---|
| *G01S 17/66* | (2006.01) |
| *G06F 7/00* | (2006.01) |
| *G01S 17/50* | (2006.01) |
| *G01S 17/42* | (2006.01) |
| *G01H 9/00* | (2006.01) |
| *G01B 11/24* | (2006.01) |
| *G01S 7/481* | (2006.01) |

(52) U.S. Cl.
CPC .............. *G01S 17/66* (2013.01); *G01B 11/24* (2013.01); *G01H 9/00* (2013.01); *G01H 9/002* (2013.01); *G01S 7/4815* (2013.01); *G01S 7/4816* (2013.01); *G01S 7/4817* (2013.01); *G01S 17/42* (2013.01); *G01S 17/50* (2013.01); *G06F 7/00* (2013.01)

(58) Field of Classification Search
CPC ...... G01S 17/66; G01S 7/4815; G01S 7/4816; G01S 7/4817; G01S 17/42; G01S 17/50; G01B 11/24; G01H 9/00; G01H 9/002; G06F 7/00
See application file for complete search history.

(56) References Cited

U.S. PATENT DOCUMENTS

| | | | |
|---|---|---|---|
| 2010/0089160 A1 | 4/2010 | Cosentino et al. | |
| 2010/0101327 A1* | 4/2010 | Fluckiger | G01H 9/00 73/657 |
| 2011/0116074 A1 | 5/2011 | Valla et al. | |

(Continued)

OTHER PUBLICATIONS

International Search Report and Written Opinion for PCT Application No. PCT/US2020/022176, dated Jun. 23, 2020, 10 pages.

*Primary Examiner* — Jennifer D Bennett
(74) *Attorney, Agent, or Firm* — Brake Hughes Bellermann LLP

(57) ABSTRACT

Techniques of measuring vibrations from an object surface using LIDAR includes grouping beams having similar vibration velocity values over a specified time window and replace outlier vibration velocity values with a vibration velocity value based on the similar vibration velocity values over the specified time window. Advantageously, replacing outlier vibration velocity values with a value based on vibration velocity values of similar beams results in a more accurate profile of the vibration velocity field over the surface.

20 Claims, 8 Drawing Sheets

(56) References Cited

U.S. PATENT DOCUMENTS

2017/0146656 A1\* 5/2017 Belsley .................. G01S 17/58
2018/0252813 A1 9/2018 Sebastian
2020/0293750 A1\* 9/2020 Zuta ..................... G06K 9/6256

\* cited by examiner

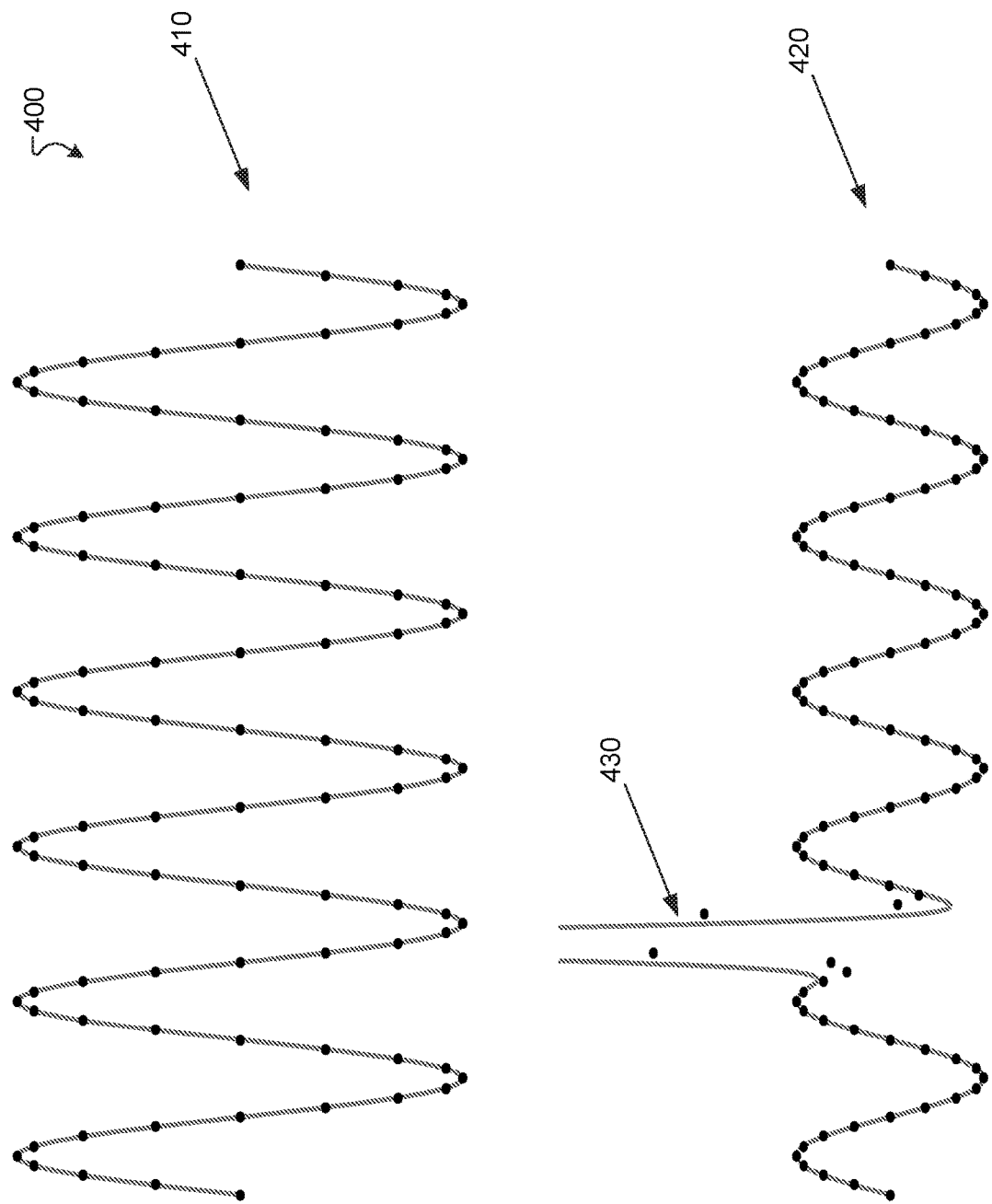

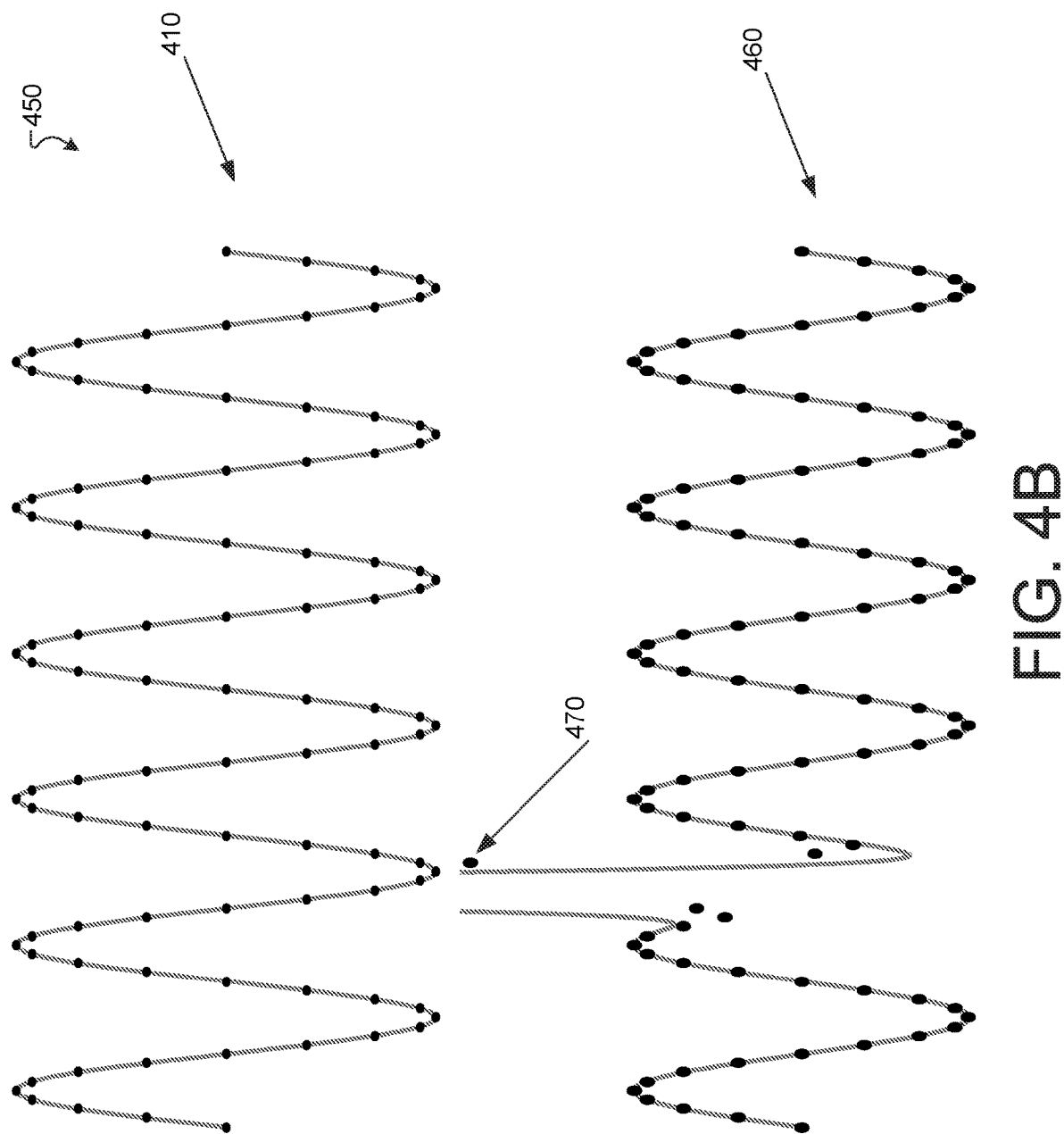

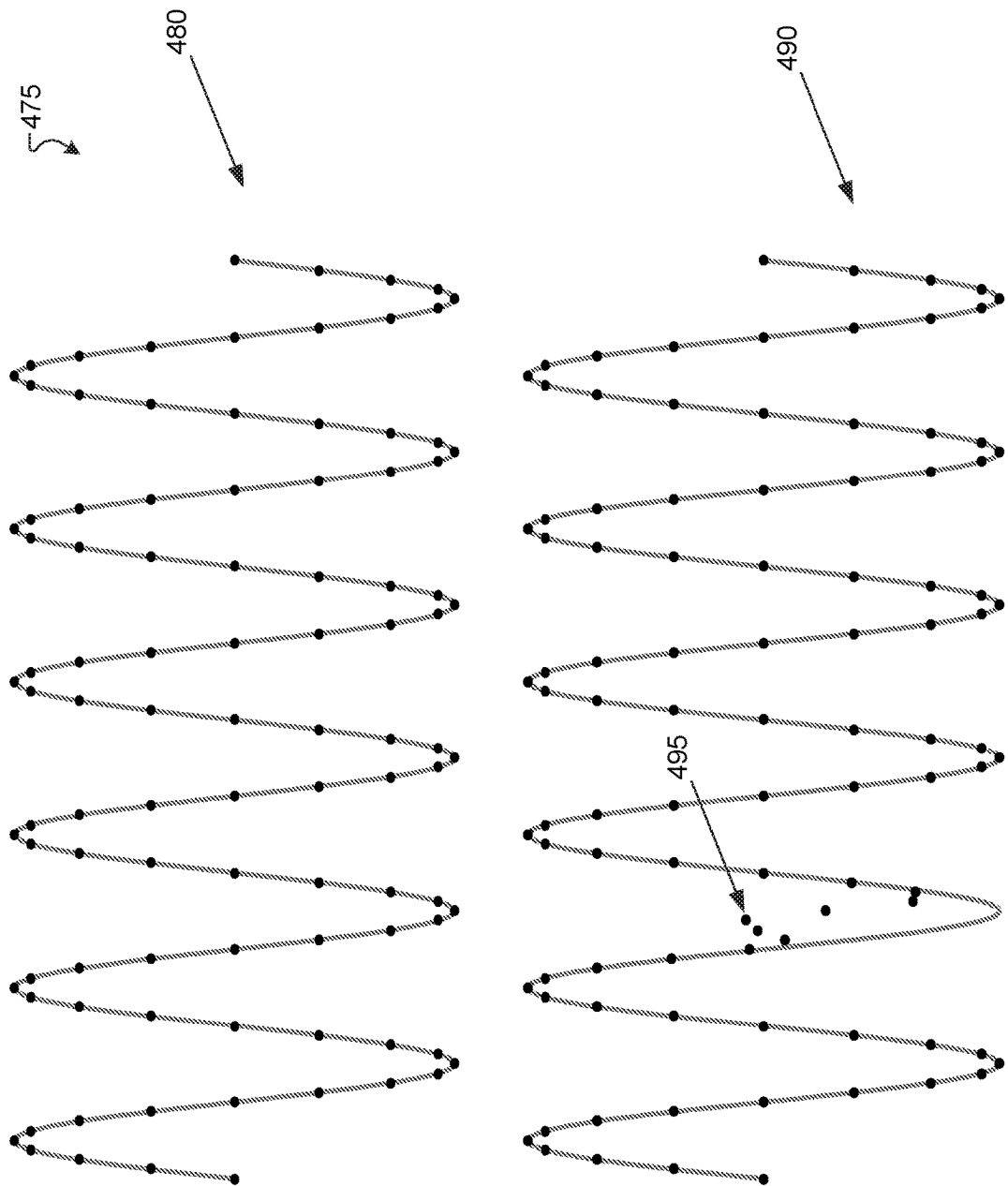

MULTI-BEAM PROCESSING OF LIDAR VIBRATION SIGNALS

CROSS-REFERENCE TO RELATED APPLICATIONS

This application is a nonprovisional of, and claims priority to, U.S. Provisional Patent Application No. 62/819,332 filed on Mar. 15, 2019, entitled "MULTI-BEAM PROCESSING OF LIDAR VIBRATION SIGNALS," the disclosure of which is incorporated by reference herein in its entirety.

TECHNICAL FIELD

This description relates to systems and methods for monitoring vibration of objects using Light Detection And Ranging (LIDAR).

BACKGROUND

Some LIDARs, for example, frequency-modulated, continuous-wave (FMCW) LIDARs, can make range and velocity measurements at each point on a surface. Moreover, some multiple-beam LIDARs can make such range and velocity measurements more frequently than those that use a single-beam LIDAR. Conventional approaches to making range and velocity measurements using a multiple-beam LIDAR include combining data from each of the multiple beams, for example, averaging the measurements from the multiple beams, to produce range and velocity estimates.

BRIEF DESCRIPTION OF THE DRAWINGS

FIG. 4A is a diagram illustrating an example set of similar time series received within the electronic environment illustrated in FIG. 1.

FIG. 4B is a diagram illustrating an example scaling of a time series received within the electronic environment illustrated in FIG. 1.

FIG. 4C is a diagram illustrating an example normalization of a time series received within the electronic environment illustrated in FIG. 1.

DETAILED DESCRIPTION

Figure 1:
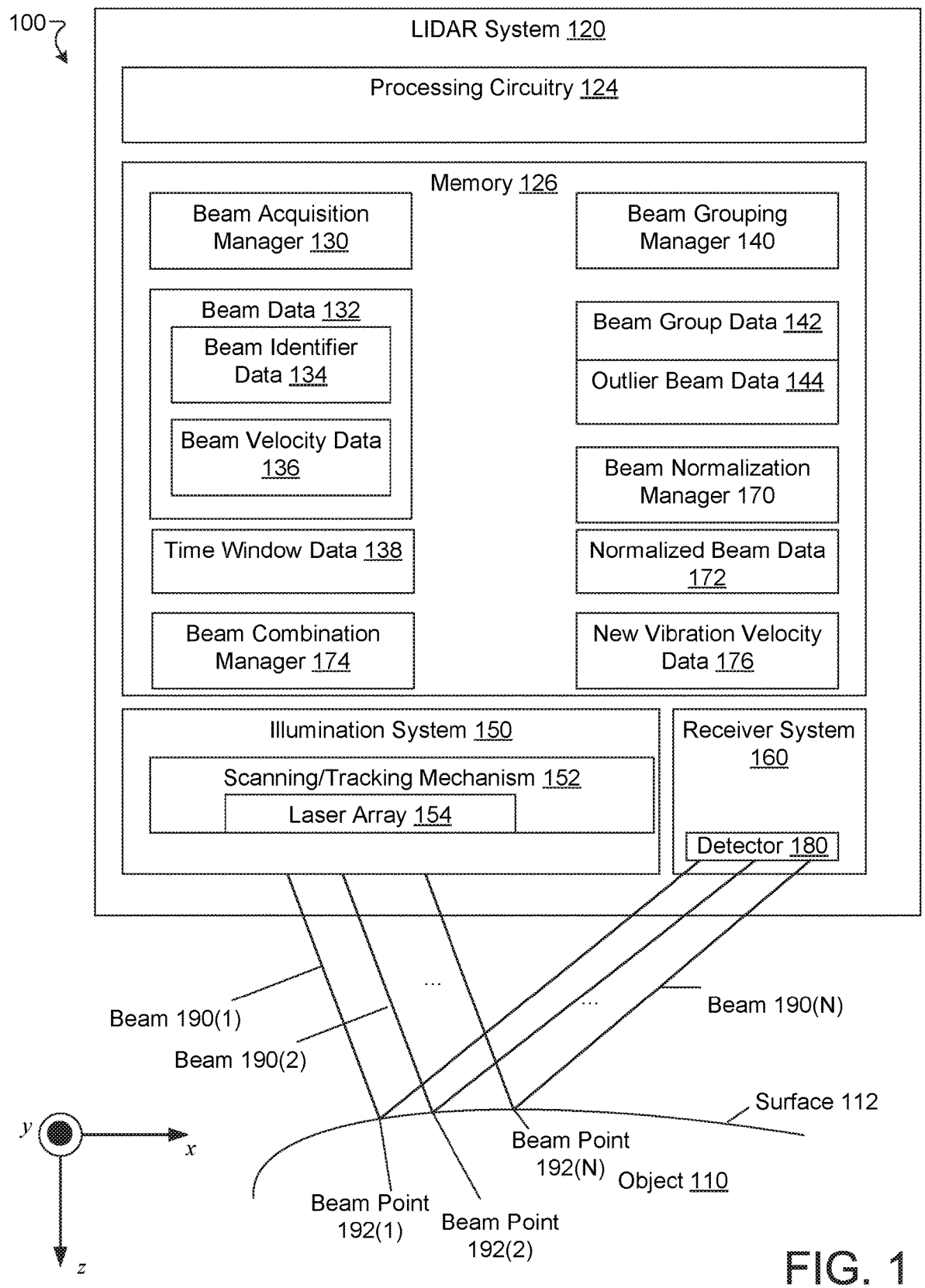
FIG. 1 is a block diagram illustrating an example LIDAR system within an electronic environment in which improved techniques described herein may be performed.

FIG. 1 is a diagram that illustrates an example electronic environment 100 in which a tracking of an object's motion is performed. The electronic environment 100 includes a LIDAR system 120 that is configured to measure a vibration velocity field over an object 110.

The object 110 is assumed herein to be a rigid body of some unknown shape. In some implementations, the object 110 is a human face. In some implementations, the object 110 is an inanimate object. The object 110 is assumed to be in motion, both linear and rotational, about an arbitrary axis. It should be understood that in the electronic environment shown in FIG. 1, there is a natural axis of symmetry that is seen to be substantially normal to the orientation of the object.

In addition, the object 110 may be undergoing vibrations as its motion is being tracked, accordingly generating a vibration velocity field over the surface of the object 110. In many cases, it is of interest to measure the vibration velocity field over at least a portion of the surface.

Nevertheless, the above-described conventional approaches to making range and velocity measurements using a multiple-beam LIDAR can be inaccurate when measuring a vibration velocity field over at least a portion of the surface. For example, when the surface is a human face, some of the multiple beams may be incident on the surface at a very nonsmooth region, e.g., where there is hair. Some of the multiple beams may miss the surface entirely. Such beams may exhibit discontinuities in vibration velocity, for example, they may have vibration velocity spikes and other outliers. In such a case, the conventional approaches may result in inaccurate measurements of the surface vibration velocity field.

Accordingly, it is the primary objective of the improved techniques described herein to locate beams having similar vibration velocity values over a specified time window and replace outlier vibration velocity values with a vibration velocity value based on the similar vibration velocity values over the specified time window. Advantageously, replacing outlier vibration velocity values with a value based on vibration velocity values of similar beams results in a more accurate profile of the vibration velocity field over the surface.

As shown in FIG. 1, the LIDAR system 120 is a single, integrated unit that includes processing circuitry 124, memory 126, an illumination system 150, and a receiver system 160. In some arrangements, the LIDAR system 120 takes the form of a handheld unit that may be pointed at the object 110. However, in other arrangements the components of the LIDAR system 120 may be distributed among different units (e.g., the processing circuitry 124 and memory 126 might be in a computing device separate from a handheld device that includes the illumination system 150 and the receiver system 160).

The processing circuitry 124 includes one or more processing chips and/or assemblies. The memory 126 includes both volatile memory (e.g., RAM) and non-volatile memory, such as one or more ROMs, disk drives, solid state drives, and the like. The set of processing units 124 and the memory 126 together form control circuitry, which is configured and arranged to carry out various methods and functions as described herein.

In some arrangements, one or more of the components of the LIDAR system 120 can be, or can include, processors configured to process instructions stored in the memory 126. For example, a beam acquisition manager 130 (and/or a portion thereof), a beam grouping manager 140, a beam normalization manager 140, and a beam combination manager 174 (and/or a portion thereof) shown as being included within the memory 126 in FIG. 1, can be a combination of a processor and a memory configured to execute instructions related to a process to implement one or more functions.

The beam acquisition manager 130 is configured to produce beam data 132 in response to the detector 180 receiving beams of electromagnetic (EM) radiation (e.g., laser light) reflected from the object 110 upon scanning the object. In some arrangements, the beam data 132 includes position data for the object 110 along the z-axis as defined in the coordinate system in FIG. 1 (i.e., out of the (x,y) plane, where x is shown as the horizontal and y is shown as the vertical) and vibration velocity data for the object 110 as defined in the coordinate system in FIG. 1.

The beam data 132 represents quantities associated with the beams reflected off the object 110 and captured by the detector 180. As shown in FIG. 1, the beam data 132 includes beam identifier data 134 and beam velocity data 136. Also shown in FIG. 1 is time window data 138 that defines a time window over which the beam data 132 is evaluated.

The beam identifier data 134 represents identifiers for each beam received at the detector 180. For example, the beam acquisition manager 130 is, in some implementations, configured to assign a number to each new beam detected at the detector 180. In some implementations, the beams do not have identifiers.

The beam velocity data 136 represents vibration velocity values produced by each beam received at the detector 180 as a function of time. The vibration velocity values, in some implementations, represent a magnitude of the vibration velocity at a beam point (e.g., 192(1)) on the surface 112. For practical reasons, the vibration velocity values are produced at a sample rate (e.g., 8000 Hz). Accordingly, the vibration velocity values produced by a beam, in some implementations, take the form of a time series of vibration velocity values, for example, with 500 samples in a time window of duration ¹⁄₁₆ sec. In some implementations, the vibration velocity values are further based on a measured phase of the beam. The measured phase may be estimated based on a known phase behavior of incident beams emitted from the LIDAR system 120.

The LIDAR system 120 analyzes the beam data 132 over the time window 138. For example, if the sample rate is 8000 Hz and the time window 138 has a duration of ¹⁄₁₆ sec, then there are 500 time samples in each time window 138.

The beam grouping manager 140 is configured to produce beam group data 142 which represents groups of similar beams, i.e., beams having similar vibration velocity behavior over the time window 138. By similar vibration velocity behavior, it is meant that the vibration velocities produced by the beams in a group at least track each other in time. In some implementations, a group of beams is forms by finding a pair of beams having a distance that is a minimum over all beams. In some implementations, the distance is based on an absolute value of a difference between vibration velocity values produced by respective beams at a time in the time window 138. In some implementations, the distance is based on a median absolute value of the distance over the time window 138. In some implementations, the distance is based on a percentile of the absolute value of the distance over the time window 138. In some implementations, the percentile measurement is performed by sorting the respective velocities produced by each beam at a time and choosing the value that percentage from the minimum vibration velocity value.

In some implementations, the percentile used is based on a level of difficulty with the measurement (e.g., the percentile decreases when the noise in the measurement process increases, and vice-versa). In some implementations, a percentile of less than 50 is used when the measurement situation is difficult so that signals with only a small common, good-quality segment over the time window 138 is used. In some implementations, a percentile of greater than 50 is used when the measurement situation is easy so that the pairing is as accurate as possible. In some implementations, the distance is based on a squared difference between vibration velocity values at a time in the time window 138.

In some implementations, the beam grouping manager 140 is further configured to select other beams to belong in a group of similar beams. In some implementations, the beam grouping manager 140 adds other beams to the group that have a sufficiently high similarity (e.g., distance) to the beams already in the group in the time window 138.

In some implementations, the beam grouping manager 140 is further configured to find a scale factor such that the pair of beams having the least distance between them have vibration velocity values over the time window 138 that are substantially the same. In some implementations, the scale factor is applied to the vibration velocity values produced by each beam of a similarity group.

In some beams, at least one of the produce vibration velocity values may be an outlier. For example, beams at a poor location on the surface 112 for pickup (e.g., those incident on hair for a human subject being monitored or beams that miss the surface 112) will not be selected for a similarity group. In addition, beams off monitored areas of the surface 112 with different vibration properties will be placed in a separate similarity group. For example, beams on a check of a person being monitored may be placed in a different similarity group as beams on a neck of the person.

In some implementations, outlier beam data 144 representing an outlier beam may take the form of a spike in the vibration velocity value, i.e., amplitude vibration velocity value that is a multiple of the other vibration velocity values produced by the outlier beam (e.g., 5X, 10X, or greater). The outliers are measured after a rescaling of the outlier beam, i.e., an application of a scale factor to the vibration velocity values produced by the outlier beam. In some implementations, outliers are determined on a single-beam basis. In some implementations, outliers are determined relative to other beams in the similarity group.

The beam normalization manager 170 is configured to replace outlier vibration velocity values from the outlier beam data 144 with an appropriate vibration velocity value to produce normalized beam data 172. The beam normalization manager 170 performs such a replacement of an outlier vibration velocity value after the vibration velocity values produced by the beams in the similarity group have been rescaled. In some implementations, the beam normalization manager 170 replaces an outlier vibration velocity value of an outlier beam with a median of the vibration velocity values of the similarity group. Because the vibration velocity values produced by the beams have been scaled as described above, there will not be a significant discontinuity if the median hops from one beam in the similarity group to another. Each beam's contribution to the median is restricted to region which are far from an outlier (e.g., from speckle) for that beam.

Note that vibration velocity values produced by the beams in different similarity groups may be scaled differently (e.g., have different scale factors) and also have different median values.

In some implementations, the vibration velocity values from different similarity groups may be combined. For audio vibration signals such combining works because the brain is accustomed to working with multiple component signals. The beam combination manager 174 is configured to combine the vibration velocity values produced by the plurality of beams to produce new vibration velocity data 176. In some implementations, the beam combination manager 174 performs an unscaling operation on the beams in each similarity group to produce unscaled vibration velocity values. For beams that did not have outliers, the unscaling operation produces the original vibration velocity values. For beams that did have outliers, the unscaling produces a new, unscaled vibration velocity value. In some implementations, the beam grouping manager 140 performs the unscaling operation.

The beam combination manager 174 produces the new vibration velocity data 176, representing accurate, time-continuous values of the vibration velocity at the points 192(1), ..., 192(N) based on parameters of the illumination system 150. For example, in some implementations, when the laser array 154 generates chirped beams, the beat frequency detected at the detector 180 is given by the following expression $$F_j(t_k) = (2R - LO)HZPM + \frac{v(t_k)}{c}F_0,$$

where $F_j$ is the beat frequency of the $j^{th}$ beam detected in the $k^{th}$ time window at time $t_k$, R is the round trip path length, or the range, HZPM is the chirp rate, LO is a local oscillator path length, v is the velocity of the object at time $t_k$, c is the velocity of light, and $F_0$ is the carrier frequency of the lasers of the laser array 154. In some implementations, a vibration velocity value is produced for each chirp. Further details may be found in the patent application U.S. Ser. No. 14/998,998, filed Jan. 13, 2016 and entitled "MULTIPLE BEAM RANGE MEASUREMENT PROCESS," the contents of which are incorporated by reference in their entirety.

The illumination system 150 is configured and arranged to produce the illumination that is reflected from the surface 112 of the object 110. As shown in FIG. 1, this illumination takes the form of multiple beams 190(1), ..., 190(N) of radiation directed along the z-axis. The illumination system 150 includes a scanning mechanism 152, which includes a laser array 154, and an aperture 170.

The scanning/tracking mechanism 152 is configured and arranged to move the laser array 154 in a scanning and/or tracking motion. As shown in FIG. 1, the scanning/tracking mechanism 152 is configured to move each laser in the laser array 154 substantially along the x and y directions, i.e., orthogonally to the direction of the beams 190(1), ..., 190(N). The scanning/tracking mechanism 152 moves the laser array 154 altogether, so that all movements are performed in one motion.

The laser array 154 is configured and arranged to produce an array of beams (e.g., beams 190(1), ..., 190(N)) of laser radiation, i.e., substantially coherent, quasi-monochromatic light. In many arrangements, the laser array 154 includes a rectangular array of lasers, each producing laser radiation at some wavelength. Each laser in the rectangular array corresponds to a sample point on the surface 112 of the object 110 where the beam produced by that laser reflects off the surface 112. In some arrangements, the wavelength of the light in each beam 190(1), ..., 190(N) produced by the laser array 154 is 1550 nm. This wavelength has the advantage of being suited to objects that are, for example, human faces. Nevertheless, other wavelengths (e.g., 1064 nm, 532 nm) may be used as well.

The receiver system 160 is configured and arranged to receive the beams reflected from the surface 112 of the object 110 and generate the displacement datasets 140(1), ..., 140(T) from the received beams. The receiver system 160 may generate the LIDAR data 142 using any number of known techniques (e.g., heterodyne detection) and will not be discussed further. The receiver system includes a detector 180 that is configured and arranged to convert the received beams into electrical signals from which the receiver system 160 may generate the LIDAR data 142. In some arrangements, the detector 180 includes a photomultiplier tube (PMT) or an array of charge-coupled devices (CCDs).

Figure 2A:
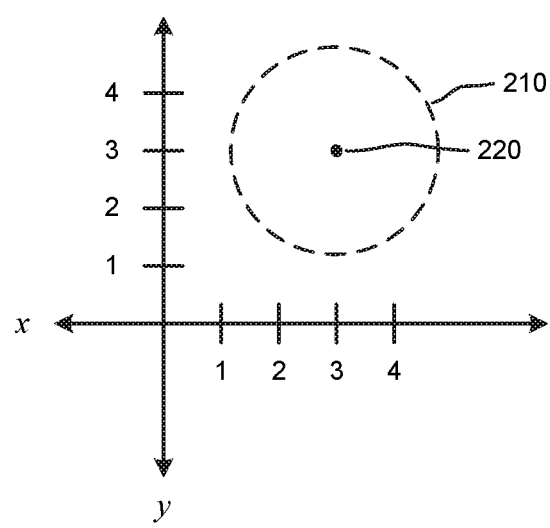
FIG. 2A is a diagram illustrating an example object being tracked within the electronic environment illustrated in FIG. 1.
Figure 2B:
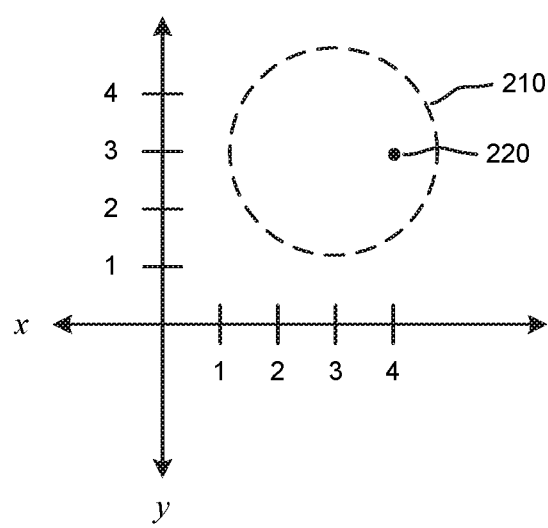
FIG. 2B is a diagram illustrating the example object as tracked within the electronic environment illustrated in FIG. 1.

FIGS. 2A and 2B illustrate an example object 210 that may be observed by (e.g., targeted by) the tracking system 120. The object 210 may have any shape, but is represented in FIGS. 2A and 2B as a circle. In FIG. 2A, at time T1 a point 220 on the object 210 is being observed by the tracking system 120. At time T1 the point 220 is located at (3,3) in the (x,y) plane. As illustrated in FIG. 2B, at time T2 the point 220 is located at (4,3) in the (x,y) plane. The movement of the point may be the result of different types of movements of the object 80. For example, the object 220 may have moved from one location to another (translational movement) or the object 220 may have rotated (for example, about an axis parallel to the y axis of the x-y plane).

Figure 2C:
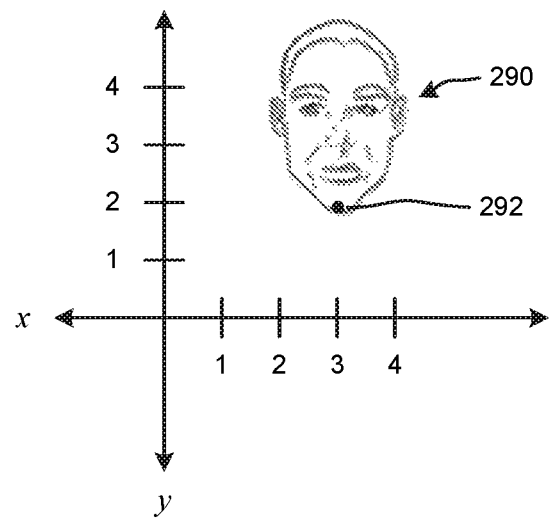
FIG. 2C is a diagram illustrating another example object being tracked within the electronic environment illustrated in FIG. 1.
Figure 2D:
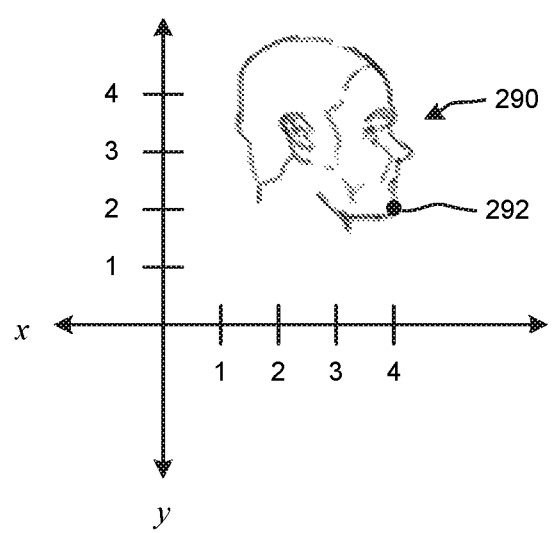
FIG. 2D is a diagram illustrating the other example object as tracked within the electronic environment illustrated in FIG. 1.
Figure 2E:
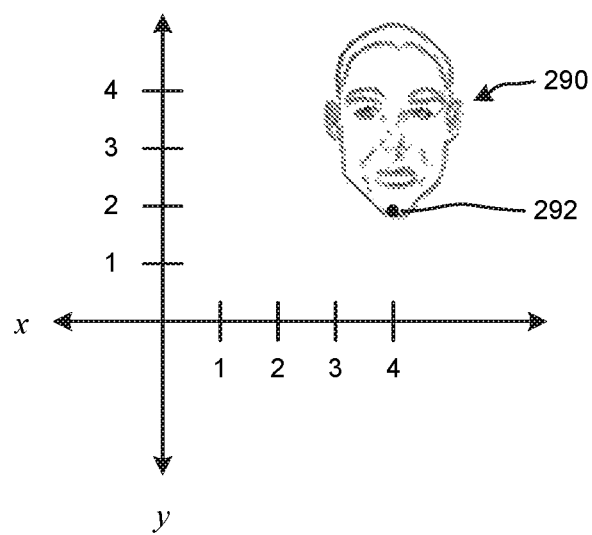
FIG. 2E is a diagram illustrating the other example object as further tracked within the electronic environment illustrated in FIG. 1.

As illustrated in FIGS. 2C, 2D, and 2E a head or face 290 of an individual may be tracked or observed by the tracking system 120. Specifically, a point or location 292 of the head or face 290 may be observed. As illustrated in FIG. 2C, at time T1 the point 292 is located at (3,2) in the (x,y) plane. At time T2 the point 292 may be observed to be at (4,2). The movement of the point may be the result of different types of motion. For example, the person or individual may have rotated their head (for example, about an axis parallel to they axis), as illustrated in FIG. 2D. Alternatively, the person or individual may have moved their head (without any rotation), as illustrated in FIG. 2E.

Figure 3:
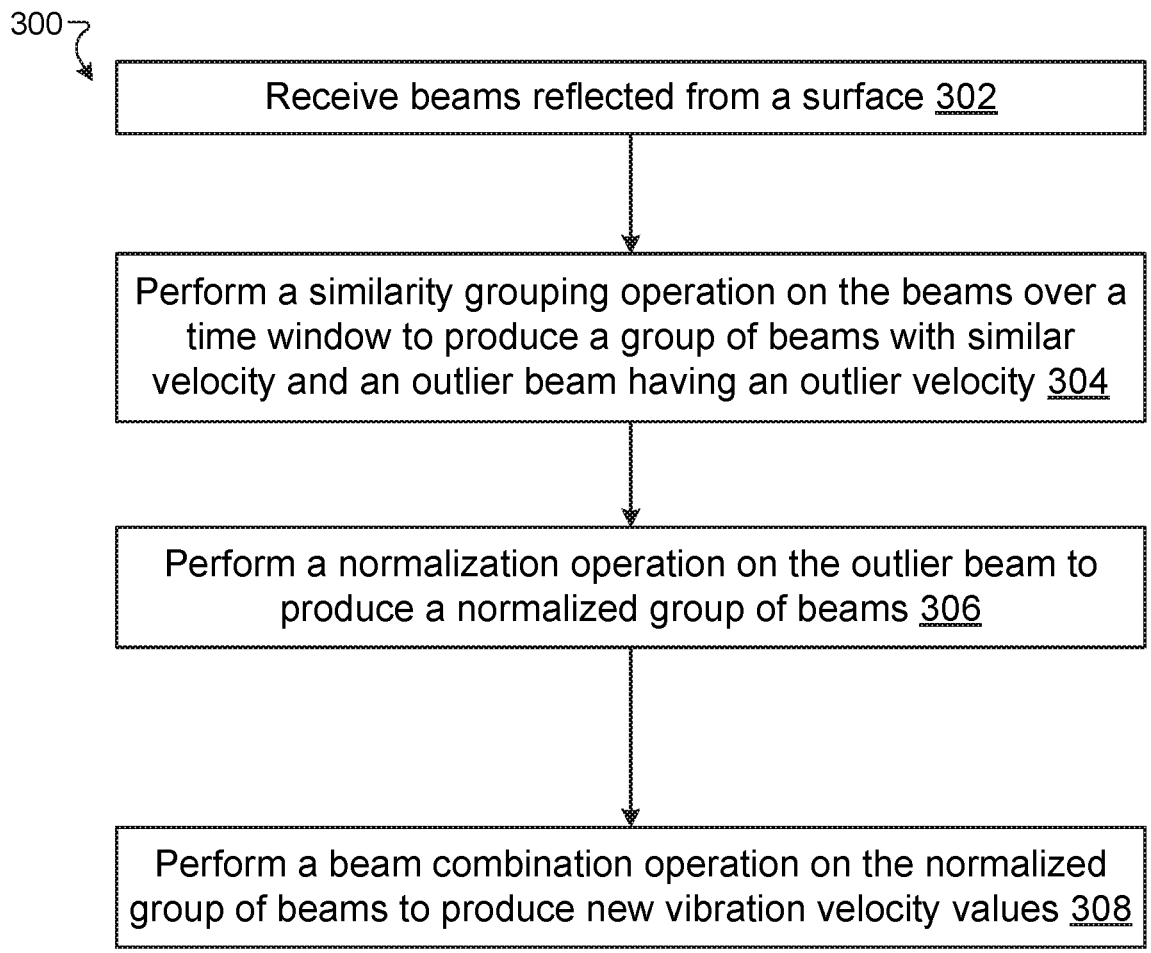
FIG. 3 is a flowchart illustrating an example method performed within the electronic environment illustrated in FIG. 1.

FIG. 3 illustrates an example method 300 of performing the improved technique described herein. The method 300 may be performed by constructs described in connection with FIG. 1, which can reside in memory 126 of the LIDAR system 120 and can be executed by the processing circuitry 124.

At 302, the LIDAR system 120 receives a plurality of beams (e.g., beams 190(1), ..., 190(N)) reflected from the surface 112, each of the plurality of beams producing respective vibration velocity values over time (e.g., beam velocity data 136).

At 304, the LIDAR system 120 performs a similarity grouping operation on the plurality of beams to produce a group of beams of the plurality of beams, at least one pair of beams of the group of beams producing substantially the same vibration velocity value, the group of beams including an outlier beam producing an outlier vibration velocity value.

At 306, the LIDAR system 120 performs a normalization operation on the outlier beam to produce a normalized group of beams, the normalization operation being based on the vibration velocity values produced by the at least one pair of beams.

At 308, the LIDAR system 120 performs a beam combination operation on the normalized group of beams to produce new vibration velocity values for the time window over the surface.

FIG. 4A illustrates an example scenario 400 in which beams produce time series of vibration velocity values 410, 420 (FIG. 1). As shown in FIG. 4A, the time series 410 and 420 are shown over a time window of 1/16 sec. Here there are 96 time samples in the time window. The beam grouping manager 140 has placed these two beams into a similarity group.

The time series 410 is shown as a simple continuous curve with the time samples represented as points along the curve. The time series 420 is also represented as a curve, albeit with a smaller variation as well as an outlier 430 due to a sample of a different portion of the surface 112 (e.g., hair on a human) and is hence an outlier beam. The effect of the outlier 430 is to create a discontinuity in the beam 420 that creates a difference in behavior over a small portion of the time window.

FIG. 4B illustrates an example scenario 450 in which the vibration velocity values of the time series 420 (FIG. 4A) is scaled to produce the time series 460, in which the vibration velocity variation is substantially matched to that of time series 410. Nevertheless, upon scaling the outlier 430 (FIG. 4A) along with the vibration velocity values of the time series 420 to produce the time series 460, the outlier values scaled similarly to produce an even large outlier 470.

The beam grouping manager 140, as discussed above, is configured to generate a scale factor to match the pair of beams 410 and 460 in vibration velocity values. In some implementations, the beam grouping manager 140 generates such a scale factor based on a ratio of vibration velocity values at various points in the time window, away from time samples at which there is an outlier.

FIG. 4C illustrates an example normalization scenario 475. In the normalization scenario 475, the beam normalization manager 170 replaces the scaled outlier value with the median of all other vibration velocity values produced by the beams of the similarity group corresponding to a time sample at which the outlier occurs. In some implementations, the beam normalization manager 170 replaces the scaled outlier value with a percentile of the other vibration velocity values produced by the beams of the similarity group. In some implementations, the percentile is less than 50 when the velocity measurement process is very noisy and difficult. In some implementations, the percentile is greater than 50 when the velocity measurement process is free of noise and other difficulties. After normalization, the beams are unscaled (e.g., by dividing the scaled vibration velocity values by the scale factor) and are ready to be combined.

Figure 5:
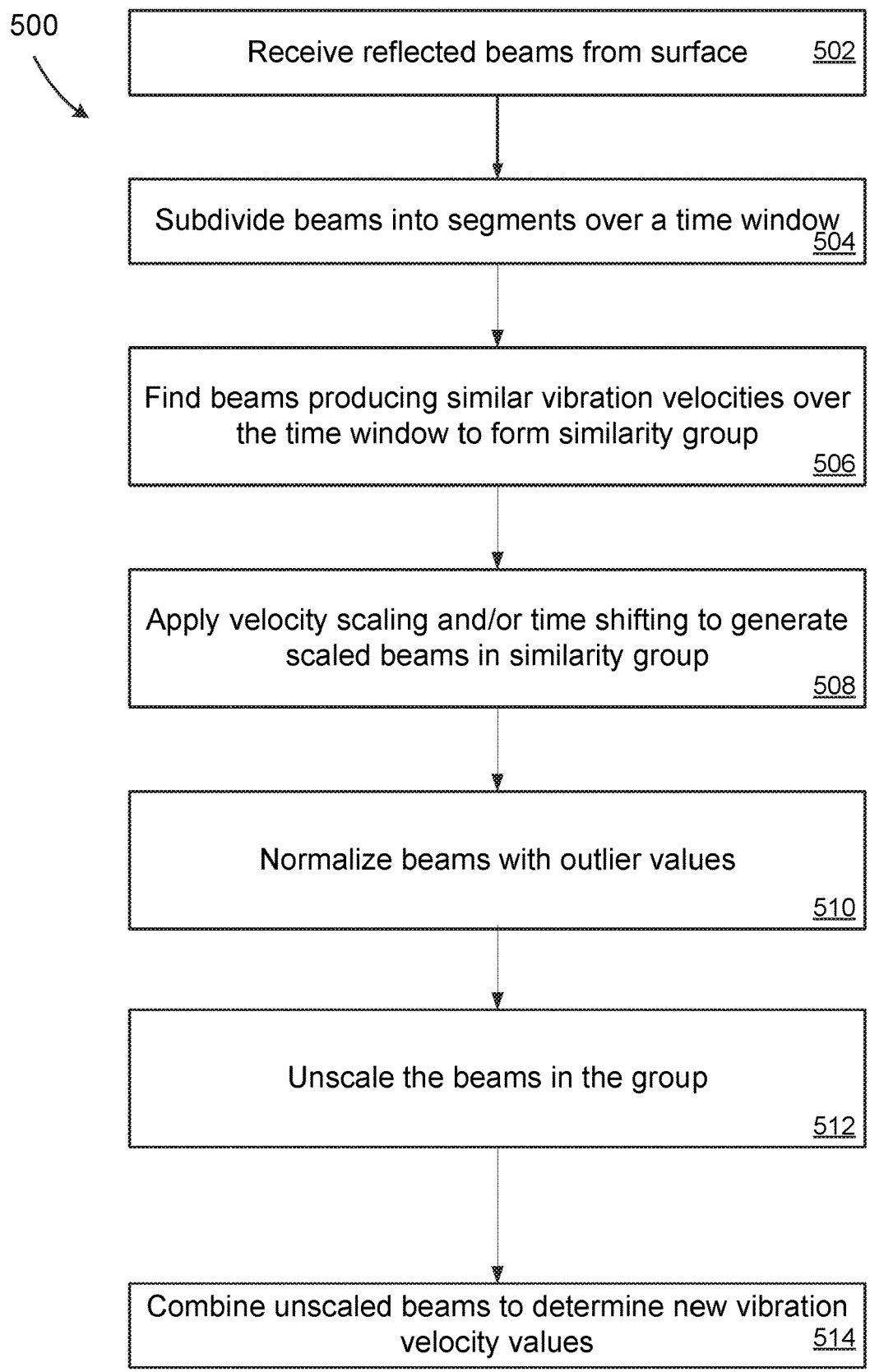
FIG. 5 is a flow chart illustrating an example process of determining vibration velocity values within the electronic environment illustrated in FIG. 1.

FIG. 5 illustrates a process 500 by which vibration velocity values are determined over the surface of an object 110 according to the improved techniques described above. The process 500 by may be performed by constructs described in connection with FIG. 1, which can reside in memory 126 of the LIDAR system 120 and can be executed by the processing circuitry 124.

At 502, the beam acquisition manager receives beams 190(1), 190(2), . . . , 190(N) at the detector 180 upon reflection from the surface 112. In some implementations, the detector 180 produces the vibration velocity values from the beams at each time sample and stores the values in memory along with a beam identifier (e.g., beam identifier data 134) to identify the beam associated with the stored vibration velocity values. In some implementations, no such identifier is used.

At 504, the beam grouping manager 140 subdivides the vibration velocity values into segments according to the time window 138. That is, all operations on the beams are performed according to the vibration velocity values of the beams during the specified time window. After the analysis is performed, new analysis is performed on the next time window, and so on. It is understood that the process 500 described herein may be performed in real time.

At 506, the beam grouping manager 140 determines beams having similar vibration velocity profiles within the time window 138 to form a similarity group. In some implementations, the beam grouping manager 140 finds the closest beam pair (i.e., smallest distance as defined above) and then adds members to the group that are close enough for joint processing. As described above, beams reflected from portions of the surface 112 with different reflective or vibrational properties (e.g., cheek vs. neck) are placed in different similarity groups.

At 508, the beam grouping manager 140 applies a respective scaling factor to the beams in each similarity group, as described with regard to FIG. 4B. In some implementations, some beams in a similarity group are out of phase with regard to others. This may result from, for example, variations in the distance of the surface 112 over the object with regard to the LIDAR system 120. In such implementations, the beam grouping manager 140 applies a time shift to such beams to align them in time with other beams in the similarity group.

At 510, the beam normalization manager 170 performs a respective normalization operation on the outlier beams in each similarity group, as described above with respect to FIG. 4C. It is noted that the normalization operation is performed on the scaled beams. In the case that a percentile vibration velocity value is used to replace an outlier value, the percentile depends on the similarity group. In some implementations, however, the percentile may be specified.

At 512, the beam combination manager 174 unscales the beams by dividing the scaled beam vibration velocity values by their respective scale factor. In some implementations, when beams are also shifted in time, the beam combination manager 174 also shifts such beams back in time to their original phase.

At 514, the beam combination manager 174 performs a combination operation on the beam vibration velocity values over all unscaled beams received at the detector within the time window to produce the values of the vibration velocity across the object, as described above. If the beams remain scaled, then there may be discontinuities within the time window 138 that give rise to inaccurate results.

In some implementations, a single vibration output signal is formed from a simple process such as a mean. In some implementations, such a signal is formed from a more complex multiple beam process. Either approach will have multiple beam processing gain. This processing dividend is realizable because the individual beams have been cleaned up (i.e., unscaled) before the beam combination process.

In some implementations, beam signals from different groups are combined. For audio vibration signals such a combination works because the brain is accustomed to working with multiple component signals, such as base vibrations from the neck and treble vibrations from the cheek, as long as the signals are free of bursts from outliers.

The components (e.g., modules, processors (e.g., a processor defined within a substrate such as a silicon substrate)) of the LIDAR system 120 (e.g., the position correction manager 144) can be configured to operate based on one or more platforms (e.g., one or more similar or different platforms) that can include one or more types of hardware, software, firmware, operating systems, runtime libraries, and/or so forth. In some implementations, the components of the LIDAR system 120 can be configured to operate within a cluster of devices (e.g., a server farm).

In some implementations, one or more portions of the components shown in the LIDAR system 120 in FIG. 1 can be, or can include, a hardware-based module (e.g., a digital signal processor (DSP), a field programmable gate array (FPGA), a memory), a firmware module, and/or a software-based module (e.g., a module of computer code, a set of computer-readable instructions that can be executed at a computer). For example, in some implementations, one or more portions of the LIDAR system 120 can be, or can include, a software module configured for execution by at least one processor (not shown). In some implementations, the functionality of the components can be included in different modules and/or different components than those shown in FIG. 1.

In some implementations, one or more of the components of the LIDAR system 120 can be, or can include, processors configured to process instructions stored in a memory. For example, the position correction manager 144 (and/or a portion thereof) can be a combination of a processor and a memory configured to execute instructions related to a process to implement one or more functions.

Although not shown, in some implementations, the components of the LIDAR system 120 (or portions thereof) can be configured to operate within, for example, a data center (e.g., a cloud computing environment), a computer system, one or more server/host devices, and/or so forth. In some implementations, the components of the LIDAR system 120 (or portions thereof) can be configured to operate within a network. Thus, the LIDAR system 120 (or portions thereof) can be configured to function within various types of network environments that can include one or more devices and/or one or more server devices. For example, the network can be, or can include, a local area network (LAN), a wide area network (WAN), and/or so forth. The network can be, or can include, a wireless network and/or wireless network implemented using, for example, gateway devices, bridges, switches, and/or so forth. The network can include one or more segments and/or can have portions based on various protocols such as Internet Protocol (IP) and/or a proprietary protocol. The network can include at least a portion of the Internet.

In some implementations, the LIDAR system 120 may include a memory. The memory can be any type of memory such as a random-access memory, a disk drive memory, flash memory, and/or so forth. In some implementations, the memory can be implemented as more than one memory component (e.g., more than one RAM component or disk drive memory) associated with the components of the tracking system 120.

In some implementations, a LIDAR system includes a laser system that includes lasers or laser beams that are configured to move in a pattern or patterns with respect to the object that is being tracked. For example, in some implementations, the scanning mechanism 152 of the LIDAR system 120 includes a plurality of lasers or beams that are configured to move in a pattern or patterns with respect to the object being tracked.

For example, in some implementations, the LIDAR system 120 may have one mode in which the laser beams are fixed or stationary and a second mode in which the laser beams move in a pattern or patterns such as a shape. In some implementations, two or more of the laser beams move in a pattern or patterns when the LIDAR system 120 is in the second mode. In some implementations, different laser beams may move independently in different patterns.

In other implementations, the LIDAR system 120 includes some lasers or produces some laser beams that are stationary and some that are configured to move in a pattern (or patterns) or shape.

The lasers or beams can move in any pattern or shape. For example, in some implementations, the lasers or beams are configured to move in elliptical shape. In other implementations, the lasers or beams are configured to move in a line, circle, square, rectangle, triangle, or any other shape. In some implementations, the shape or pattern that the lasers or beams move in are dictated or determined by the object that is being tracked. For example, in some implementations, the pattern or shape of the laser movement may be similar to the shape of the object that is being tracked. For example, an elliptical shape or pattern may be used when tracking a face of an individual as the face of an individual is generally elliptical in shape.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device (computer-readable medium, a non-transitory computer-readable storage medium, a tangible computer-readable storage medium) or in a propagated signal, for processing by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be processed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the processing of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD- ROM and DVD-ROM disks. The processor and the memory may be supplemented by, or incorporated in special purpose logic circuitry.

To provide for interaction with a user, implementations may be implemented on a computer having a display device, e.g., a liquid crystal display (LCD or LED) monitor, a touchscreen display, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

In some implementations, the LIDAR system 120 may achieve millimeter range accuracy performance off moving faces of a subject or individual. However, in some implementations, solid object velocity estimation requires processing of multiples samples in order to remove significant velocity components from speech and other biological components. A 500 Hz vibration with an amplitude of 0.05 mm (50 microns) will have a maximum velocity of (2*π*500*5E-5=0.157 m/sec) about 16 cm/sec. Even though the amplitude of the vibration is an insignificant range change for the process of tracking faces of a subject or individual, the instantaneous velocity may be significant and the vibrational velocity may be removed. In some implementations, removing vibrational velocity may require processing a velocity data sample significantly longer than the periods of the vibrations to be removed and care to avoid noise or bias. For example, noise in the velocity (for example, velocity in the z direction) can affect or degrade the ability to detect or determine the rotation of the object or the z velocity of the object. In some implementations, the vibration or velocity noise is relatively small and can be averaged out to remove its effects.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. A method, comprising:
receiving, by processing circuitry of a computer configured to determine a vibration velocity field over a surface of an object, a plurality of beams reflected from the surface, each of the plurality of beams producing respective vibration velocity values over time;
performing, by the processing circuitry, a similarity grouping operation on the plurality of beams to produce a group of beams of the plurality of beams, at least one pair of beams of the group of beams producing substantially the same vibration velocity value, the group of beams including an outlier beam producing an outlier vibration velocity value;
performing, by the processing circuitry, a normalization operation on the outlier beam to produce a normalized group of beams, the normalization operation being based on the vibration velocity values produced by the at least one pair of beams; and
performing, by the processing circuitry, a beam combination operation on the normalized group of beams to produce new vibration velocity values for each of the group of beams, the new vibration velocity values being more accurate than the vibration velocity value produced by each of the plurality of beams.

2. The method as in claim 1, wherein performing the similarity grouping operation includes locating a pair of beams of the group of beams producing vibration velocity values such that the vibration velocity value produced by a second beam of the pair of beams increases and decreases as the vibration velocity value produced by a first beam of the pair of beams.

3. The method as in claim 1, wherein performing the normalization operation includes replacing a first vibration velocity value produced by a beam of the group of beams with a second vibration velocity value, the second vibration velocity value being based on the vibration velocity values produced by the other beams of the group of beams.

4. The method as in claim 3, wherein the first vibration velocity value is an outlier vibration velocity value.

5. The method as in claim 3, wherein performing the normalization operation includes generating, as the second vibration velocity value, a median of the vibration velocity values produced by the other beams.

6. The method as in claim 3, wherein performing the normalization operation includes generating, as the second vibration velocity value, a vibration velocity value at a percentile of the vibration velocity values produced by the other beams of the group of beams.

7. The method as in claim 6, wherein the percentile decreases with increasing noise in the vibration velocity values produced by the other beams of the group of beams.

8. A computer program product comprising a nontransitory storage medium, the computer program product including code that, when executed by processing circuitry of a computer configured to determine a vibration velocity field over a surface of an object, cause the computer to perform a method, the method comprising:
receiving a plurality of beams reflected from the surface, each of the plurality of beams producing respective vibration velocity values over time;
performing a similarity grouping operation on the plurality of beams to produce a group of beams of the plurality of beams, at least one pair of beams of the group of beams producing substantially the same vibration velocity value, the group of beams including an outlier beam producing an outlier vibration velocity value;

performing a normalization operation on the outlier beam to produce a normalized group of beams, the normalization operation being based on the vibration velocity values produced by the at least one pair of beams; and performing a beam combination operation on the normalized group of beams to produce new vibration velocity values for each of the group of beams, the new vibration velocity values being more accurate than the vibration velocity value produced by each of the plurality of beams.

9. The computer program product as in claim 8, wherein performing the similarity grouping operation includes rescaling the vibration velocity value produced by a second beam of a pair of beams of the group of beams to match the vibration velocity value produced by a first beam of the pair of beams.

10. The computer program product as in claim 9, wherein the performing the beam combination operation includes, after performing the normalization operation, performing an unscaling operation on the second beam of the pair of beams to recover the vibration velocity value produced by the second beam.

11. The computer program product as in claim 8, wherein performing the similarity grouping operation includes generating a median distance between a first beam of the plurality of beams and a second beam of the plurality of beams.

12. The computer program product as in claim 11, wherein the median distance includes a median of an absolute value of the difference between vibration velocity values produced by the first beam and the second beam.

13. The computer program product as in claim 8, wherein performing the similarity grouping operation includes performing a time shift operation on a second beam of the group of beams to produce a time-shifted second beam having a reduced median distance from a first beam of the group of beams.

14. An electronic apparatus, the electronic apparatus comprising
a memory; and
controlling circuitry coupled to the memory, the controlling circuitry being configured to:
receive a plurality of beams reflected from a surface, each of the plurality of beams producing respective vibration velocity values over time;
perform a similarity grouping operation on the plurality of beams to produce a group of beams of the plurality of beams, at least one pair of beams of the group of beams producing substantially the same vibration velocity value, the group of beams including an outlier beam producing an outlier vibration velocity value;

perform a normalization operation on the outlier beam to produce a normalized group of beams, the normalization operation being based on the vibration velocity values produced by the at least one pair of beams; and perform a beam combination operation on the normalized group of beams to produce new vibration velocity values for each of the group of beams, the new vibration velocity values being more accurate than the vibration velocity value produced by each of the plurality of beams.

15. The electronic apparatus as in claim 14, wherein each of the plurality of beams produce a respective vibration velocity value over time based on a measured phase of that beam.

16. The electronic apparatus as in claim 15, further comprising a laser source, and
wherein the measured phase of each of the plurality of beams is estimated based on a known phase behavior of incident beams emitted from the laser source.

17. The electronic apparatus as in claim 14, wherein the controlling circuitry configured to perform the normalization operation is further configured to replace a first vibration velocity value produced by a beam of the group of beams with a second vibration velocity value, the second vibration velocity value being based on the vibration velocity values produced by the other beams of the group of beams.

18. The electronic apparatus as in claim 17, wherein the first vibration velocity value is an outlier vibration velocity value.

19. The electronic apparatus as in claim 17, wherein the controlling circuitry configured to perform the normalization operation is further configured to generate, as the second vibration velocity value, a median of the vibration velocity values produced by the other beams.

20. The electronic apparatus as in claim 17, wherein the controlling circuitry configured to perform the normalization operation is further configured to generate, as the second vibration velocity value, a vibration velocity value at a percentile of the vibration velocity values produced by the other beams of the group of beams.

* * * * *